United States Patent
Weintraub et al.

(10) Patent No.: US 11,146,563 B1
(45) Date of Patent: Oct. 12, 2021

(54) POLICY ENFORCEMENT FOR SEARCH ENGINES

(71) Applicant: BlueTalon, Inc., Redwood City, CA (US)

(72) Inventors: Benjamin L. Weintraub, Sunnyvale, CA (US); Pratik Verma, Hopkins, MN (US); Prasad Mujumdar, Fremont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 311 days.

(21) Appl. No.: 15/885,015

(22) Filed: Jan. 31, 2018

(51) Int. Cl.
*G06F 16/903* (2019.01)
*H04L 29/06* (2006.01)
*G06F 16/9535* (2019.01)

(52) U.S. Cl.
CPC ...... *H04L 63/102* (2013.01); *G06F 16/90335* (2019.01); *G06F 16/9535* (2019.01); *H04L 63/20* (2013.01)

(58) Field of Classification Search
CPC .. G06F 16/2228; G06F 16/2455; G06F 16/30; G06F 16/313; G06F 16/33; G06F 16/3329; G06F 16/335; G06F 16/9535; G06F 17/2705; G06F 17/272; G06F 17/2785; G06F 16/951; G06F 16/24575; G06F 16/248; G06F 16/9038; G06F 16/90328; G06F 21/6227; G06F 16/9032; G06F 16/90335; H04L 63/101; H04L 67/306; H04L 9/3226; H04L 63/102; H04L 63/20
See application file for complete search history.

(56) References Cited

U.S. PATENT DOCUMENTS

| | | | |
|---|---|---|---|
| 5,537,548 A | 7/1996 | Fin | |
| 6,463,470 B1 | 10/2002 | Mohaban | |
| 6,687,229 B1 | 2/2004 | Kataria | |
| 7,127,450 B1 * | 10/2006 | Chang | G06F 16/338 |

(Continued)

OTHER PUBLICATIONS

PCT International Search Report in International Application No. PCT/US2018/017698, dated May 21, 2018, 3 pages.

(Continued)

*Primary Examiner* — Trang T Doan
(74) *Attorney, Agent, or Firm* — Fiala & Weaver P.L.L.C.

(57) ABSTRACT

Systems, computer program products and methods implementing policy enforcement for search engines are described. A policy engine receives a user identifier associated with a search query including one or more query terms. The policy engine receives, from a preprocessor of a search engine, an intermediate representation of the search query. The intermediate representation includes one or more index terms corresponding to the one or more query terms. The policy engine determines, based on a particular policy, if the user is prohibited from accessing data associated with a particular index term. In response, the policy engine modifies the intermediate representation, including negating the particular index term. The policy engine then submits the modified intermediate representation to a query processing module of the search engine, causing the query processing module to exclude content corresponding to the particular index term from search results.

22 Claims, 5 Drawing Sheets

(56) References Cited

U.S. PATENT DOCUMENTS

| | | | |
|---|---|---|---|
| 7,181,438 B1* | 2/2007 | Szabo | G06F 21/6245 |
| 7,542,943 B2 | 6/2009 | Caplan | |
| 7,631,084 B2 | 12/2009 | Thomas | |
| 7,730,089 B2 | 6/2010 | Campbell | |
| 8,181,221 B2 | 5/2012 | Manickam et al. | |
| 8,613,108 B1 | 12/2013 | Aggarwal | |
| 8,640,017 B1* | 1/2014 | Chang | G06F 16/36 |
| | | | 715/200 |
| 8,677,447 B1 | 3/2014 | Zuk et al. | |
| 8,849,848 B2* | 9/2014 | Zeller | G06F 16/951 |
| | | | 707/769 |
| 9,071,594 B2 | 6/2015 | Boulos et al. | |
| 9,866,592 B2 | 1/2018 | Arumugam et al. | |
| 9,871,825 B2 | 1/2018 | Arumugam et al. | |
| 9,886,510 B2* | 2/2018 | Chang | G06F 16/951 |
| 10,423,690 B2* | 9/2019 | Kovalev | H04L 67/02 |
| 2002/0007404 A1 | 1/2002 | Vange | |
| 2002/0019828 A1 | 2/2002 | Mortl | |
| 2002/0143827 A1* | 10/2002 | Crandall | G06F 40/289 |
| | | | 715/256 |
| 2002/0169907 A1 | 11/2002 | Candea | |
| 2003/0018786 A1 | 1/2003 | Lortz | |
| 2003/0021283 A1 | 1/2003 | See | |
| 2003/0046315 A1 | 3/2003 | Feig | |
| 2003/0115322 A1 | 6/2003 | Moriconi | |
| 2004/0054791 A1 | 3/2004 | Chakraborty | |
| 2004/0073668 A1 | 4/2004 | Bhat | |
| 2004/0088560 A1 | 5/2004 | Danks | |
| 2005/0021978 A1 | 1/2005 | Bhat | |
| 2005/0045718 A1* | 3/2005 | Bortolin | G07F 7/1008 |
| | | | 235/383 |
| 2005/0091212 A1 | 4/2005 | Mohamed et al. | |
| 2006/0053216 A1 | 3/2006 | Deokar | |
| 2006/0212435 A1* | 9/2006 | Williams | G06F 16/951 |
| 2007/0124797 A1 | 5/2007 | Gupta | |
| 2007/0174831 A1 | 7/2007 | Lee | |
| 2007/0234408 A1 | 10/2007 | Burch | |
| 2007/0255698 A1* | 11/2007 | Kaminaga | G06F 21/6227 |
| 2008/0091747 A1* | 4/2008 | Prahlad | G06F 21/6218 |
| 2008/0301437 A1 | 12/2008 | Chevalier | |
| 2009/0049512 A1 | 2/2009 | Manickam et al. | |
| 2009/0299998 A1* | 12/2009 | Kim | G06F 16/951 |
| 2010/0024019 A1 | 1/2010 | Backlund | |
| 2010/0235396 A1 | 9/2010 | Chaurasia et al. | |
| 2010/0281524 A1 | 11/2010 | Ghittino | |
| 2011/0209194 A1 | 8/2011 | Kennedy | |
| 2012/0095972 A1* | 4/2012 | Van Roy | G06F 16/3322 |
| | | | 707/694 |
| 2012/0095984 A1* | 4/2012 | Wren-Hilton | G06F 16/9535 |
| | | | 707/707 |
| 2012/0198467 A1 | 8/2012 | Jackson | |
| 2013/0332982 A1 | 12/2013 | Rao et al. | |
| 2014/0068699 A1 | 3/2014 | Balacheff | |
| 2014/0090085 A1 | 3/2014 | Mattsson | |
| 2014/0128053 A1 | 5/2014 | Merchant | |
| 2014/0196115 A1 | 7/2014 | Pelykh | |
| 2014/0207724 A1* | 7/2014 | Ledenev | G06N 5/02 |
| | | | 706/47 |
| 2014/0351573 A1 | 11/2014 | Martini | |
| 2014/0373176 A1* | 12/2014 | Arning | G06F 16/93 |
| | | | 726/28 |
| 2015/0113010 A1 | 4/2015 | Muthyala et al. | |
| 2015/0128205 A1 | 5/2015 | Mahaffey | |
| 2016/0085962 A1 | 3/2016 | Sokolov et al. | |
| 2016/0119349 A1 | 4/2016 | Wang et al. | |
| 2016/0149859 A1 | 5/2016 | Curtis | |
| 2016/0205101 A1 | 7/2016 | Verma et al. | |
| 2016/0224660 A1* | 8/2016 | Munk | G06F 16/316 |
| 2016/0342803 A1 | 11/2016 | Goodridge | |
| 2017/0012962 A1 | 1/2017 | Lissack | |
| 2017/0093925 A1 | 3/2017 | Sheretov | |
| 2017/0199989 A1* | 7/2017 | Lilko | G06F 21/10 |
| 2017/0208033 A1 | 7/2017 | Roskind | |
| 2017/0220680 A1* | 8/2017 | Shattuck | G06F 16/951 |
| 2018/0032747 A1* | 2/2018 | Whelan | G06F 16/2282 |
| 2018/0131726 A1 | 5/2018 | Arumugam et al. | |
| 2018/0131727 A1 | 5/2018 | Arumugam et al. | |
| 2018/0285466 A1* | 10/2018 | Kovalev | H04L 67/146 |

OTHER PUBLICATIONS

International Application No. PCT/US2016/054107, Notification of Transmittal of the International Search Report and the Written Opinion of the International Searching Authority, dated Jan. 9, 2017, 13 pages.

International Application No. PCT/US2016/065853, Notification of Transmittal of the International Search Report and the Written Opinion of the International Searching Authority, dated Mar. 24, 2017, 14 pages.

* cited by examiner

POLICY ENFORCEMENT FOR SEARCH ENGINES

TECHNICAL FIELD

This application relates to computer system security techniques for search engines.

BACKGROUND

A search engine can provide relevant search results in response to a search query received from a user device. The user device can receive the search query including one or more query terms from a user through a user interface, e.g., a search field of a browser. The user device provides the search query to the search engine. The search engine performs a search on the search terms based on one or more indices, and provides the search results back to the user device. Security measures can be implemented to prevent a user from accessing certain search results. For example, browser-based filters may hide certain search results based on user settings and sources of the search results; early binding techniques may add or remove terms from the query, for example, by adding access control list (ACL) terms to the query, before the query reaches the search engine; late binding techniques may examine search results from the search engine, for example, and remove certain search results based on an ACL, before sending query results back to the user device. These techniques can be implemented on the user device, for example, as a browser plugin, or on an intermediary between the user device and the search engine.

SUMMARY

Systems, computer program products and methods implementing policy enforcement for search engines are described. Through an application programming interface (API), a policy engine enforces policies that define a user's access privileges to data. The policy engine receives credentials associated with a search query including one or more query terms. The credentials can indicate a user requesting the query. The policy engine receives, from a preprocessor of a search engine, an intermediate representation of the query. The intermediate representation includes one or more index terms corresponding to the one or more query terms, as determined by the preprocessor. The policy engine determines, based on a particular policy, if the specified user is prohibited from accessing data associated with a particular index term. In response, the policy engine modifies the intermediate representation, including negating the particular index term. The policy engine then submits the modified intermediate representation to a query processing module of the search engine, causing the query processing module to generate one or more search results excluding content corresponding to the particular index term. When the query processing module returns the search result to the user device, the excluded content is invisible to the user, according to the policy.

Particular embodiments of the subject matter described in this specification can be implemented to realize, but are not limited to, one or more of the following example advantages. The disclosed techniques allow a computer system to enforce a policy limiting what a user can search. The limit can be based on meaning of a search term, rather than the search term itself. Accordingly, the disclosed techniques provide more flexibility than conventional content management techniques where content is restricted based on spelling.

The disclosed techniques improve upon various conventional techniques by providing a centralized security system without incurring performance costs commonly associated with the conventional techniques. For example, compared to conventional browser-side filtering, the disclosed techniques are more suitable for enforcing uniform policies across a group of users, whereas the browser-side filtering typically is controlled by individual users, which may cause inconsistency. Compared to conventional early-binding security techniques, the disclosed techniques do not require a content source to maintain an access control list, and avoid appending a query with sometimes long and complex access restrictions. Compared to conventional late-binding security techniques, the disclosed techniques do not require individualized check on each search result, and accordingly, can be much faster.

The disclosed techniques can be customized, to allow policy-based security for different search engines, and are thus flexible. The disclosed techniques can be consistent with other policy-based security schemes such as those implemented on distributed file storage systems, and thus, compared to other search engine security techniques, require less training for people already using a policy-based security system.

The details of one or more embodiments of the subject matter of this specification are set forth in the accompanying drawings and the description below. Other features, aspects and advantages of the subject matter will become apparent from the description, the drawings and the claims.

DETAILED DESCRIPTION

Figure 1:
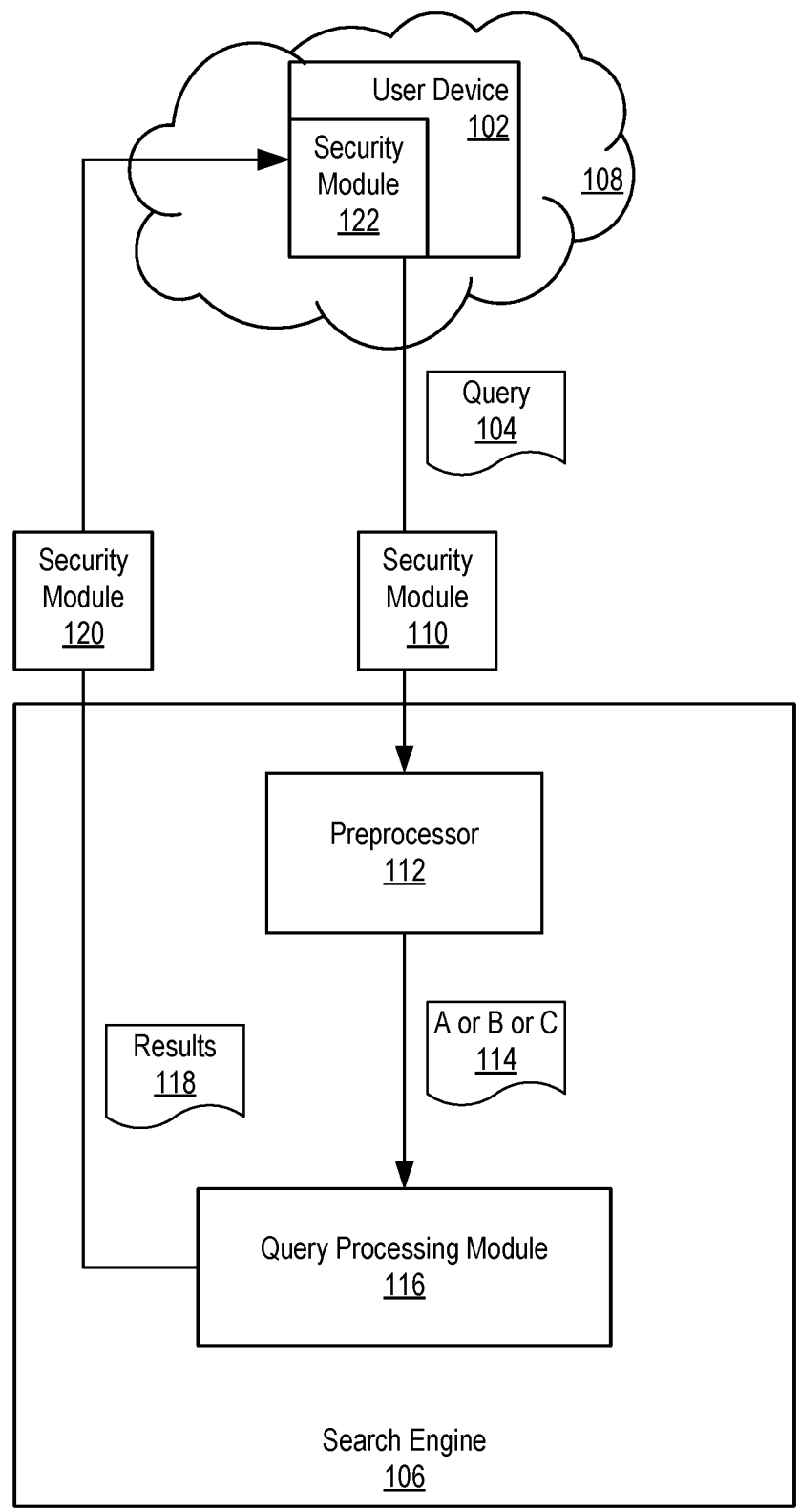
FIG. 1 is a block diagram illustrating an example search system implementing conventional security techniques.

FIG. 1 is a block diagram illustrating an example search system implementing conventional security techniques. A user device 102 receives a user input through a search interface, e.g., a search field of a browser. The user device 102 can be a computing device including one or more processors. The user input includes one or more search terms, e.g., words such as "winter sports trivai." The search terms may contain one or more typographical errors. For example, "trivia" is misspelled as "trivai" by the user. The user device 102 submits a search query 104 to a search engine 106 through a communication network 108.

In some implementations, a first security module 110 is logically positioned between the user device 102 and the search engine 106. The first security module 110 is configured to access one or more external security services to determine access privileges of the user requesting the search. The first security module 110 can modify the query 104 to include various conditions into the search query 104 that limit what the search engine can retrieve. The first security module 110 then provides the search query 104, in the modified form, to the search engine 106. The search query 104 in the modified form can include the original search terms and additional condition, for example, in the form of "(winter sports trivai) AND ([conditions])" where "AND" is an operator.

The search engine 106 receives the search query 104 in the modified form. A preprocessor 112 of the search engine 106 can generate one or more indices 114 from the received search query. The one or more indices can include normalized search terms, various expressions, or other content. The normalized search terms, various expressions, or other content can be specific to the particular search engine 106, where other types of search engines can have different indices.

In the example shown, the indices 114 has the form "A or B or C" where A, B and C are index terms generated based on the search terms in the search query 104. Depending on specifics of the search engine 106, the preprocessor 112 may generate index terms, which can be normalized index terms. For example, the preprocessor 112 can generate index terms "winter OR sports OR trivia" or "winter OR sport OR trivia" where the index terms "sport" and "trivia" are normalized from the search terms "sports" and "trivai," respectively.

The preprocessor 112 provides the indices 114 to a query processing module 116. The query processing module 116 performs the search, and generates one or more search results 118. In some implementations, a second security module 120 is logically positioned between the user device 102 and the search engine 106. The second security module 120 is configured to determine access privileges of the user requesting the search, and limit access to some search results before passing the search results to the user device 102. In some implementations, a third security module 122, e.g., a Web browser plugin, is implemented on the user device to further limit the user's access to certain search results.

Figure 2:
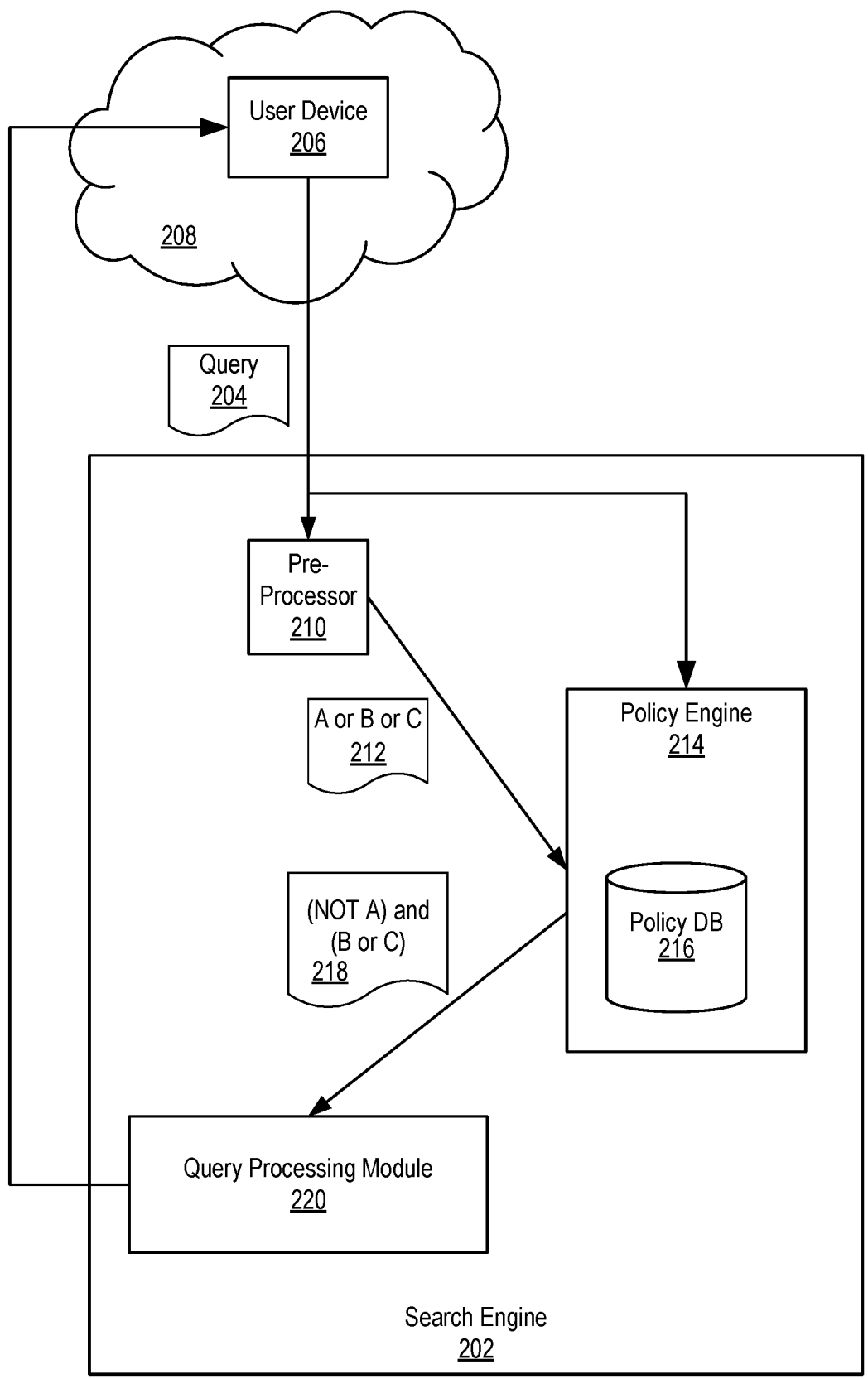
FIG. 2 is a block diagram illustrating an example architecture for policy enforcement on a search engine.

FIG. 2 is a block diagram illustrating an example architecture for policy enforcement on a search engine 202. The search engine 202 receives a search query 204 from a user device 206 through a communications network 208. The search query 204 includes one or more search terms, e.g., "winter sports trivai." A preprocessor 210 of the search engine generates one or more indices 212 based on the search terms in the query 204. The indices 212, also referred to as an intermediate representation, are a representation of the query 204 in the search engine 202. The intermediate representation can include meaning of the search terms as determined by the preprocessor 210. In the example shown, the indices 212 has the form of "A or B or C" where each of A, B and C is an index term. The index terms can be text strings or binary representations of text strings. The text strings can include words (e.g., "winter"), words with wild cards (e.g., "winter*" where "*" is a wildcard), or regular expressions.

The query 204 can include, or be associated with, user credentials of the user submitting the query. The user credentials can include a user name, one or more authentication tokens, or both. The user credentials can be established for a session between the user device 206 and the search engine 202.

A policy engine 214 receives the indices 212. The policy engine 214 is implemented on one or more computer processors configured to store, manage and enforce one or more policies that specify user access rights to search activities, e.g., what terms a user can search on, and search results, e.g., what search results a user can view. The policy engine 214 can be a component of the search engine 202, or be external to the search engine 202 and communicate with the search engine 202 through a plugin component. The policy engine 214 can communicate with various components of the search engine 202 through an application programming interface (API). The policy engine 214 can receive the user credentials in addition to the indices 212.

The policy engine 214 can identify one or more policies associated with a user corresponding to the user credentials. A policy can specify the user's access rights to a resource. The access rights can include, for example, allow read access, deny read access, or allow only partial access. The resource, unlike conventional access control system targeting files, database tables or directories, can include one or more index terms. For example, a particular policy associated with the user, or associated with a group of users including the user, can specify that the user cannot access searches related to index term "winter" or can only access some portions of search results related to that index term. The policy can be stored in a policy database 216. The policy engine 214 can retrieve the policy from the policy database 216 by performing a lookup using the user credentials or using other secured information retrieval method.

The policy engine 214 can modify the indices 212 based on the one or more retrieved policies. For example, if a particular policy specifies that the user requesting the search is prohibited from accessing a particular index term A, the policy engine 214 can modify the indices 212 to negate the search term A. In some implementations, negating the search term A includes removing the search term A from the indices 212. In this example, where the query 204 includes query terms "winter sports trivai," the modified indices 218 can include the string "sport OR trivia."

In some implementations, negating the search term A includes adding an operator "NOT" to the search term A, and associating the "NOT A" term with other terms in the indices 212 using an "AND" operator. Accordingly, from the indices 212 "A or B or C," the policy engine 214 generates modified indices 218, which has the term "(NOT A) AND (B OR C)." In this example, where the query 204 includes query terms "winter sports trivai," the modified indices 218 can include a string "(NOT winter) AND (sport OR trivia)." In various implementations, the NOT and AND relationship can be expressed using various operators. For example, in some implementations, symbols "!," "^" or "~" can represent NOT, whereas "&" or "&&" can represent AND.

The policy engine 214 submits the modified indices 218 to a query processing module 220 of the search engine 202. The policy engine 214 can submit the modified indices 218 through an API. The query processing module 220, instead of receiving the indices 212 directly from the preprocessor 210 as in conventional implementations, receives the modified indices 218 and performs search based on the modified indices 218. The query processing module 220 then provides search results back to the user device 206. In the example, the search results include content related to "sport" or "trivia" but unrelated to "winter." The user device 206 can display the search results on a display device, e.g., on a display surface of a smartphone in a browser.

Figure 3:
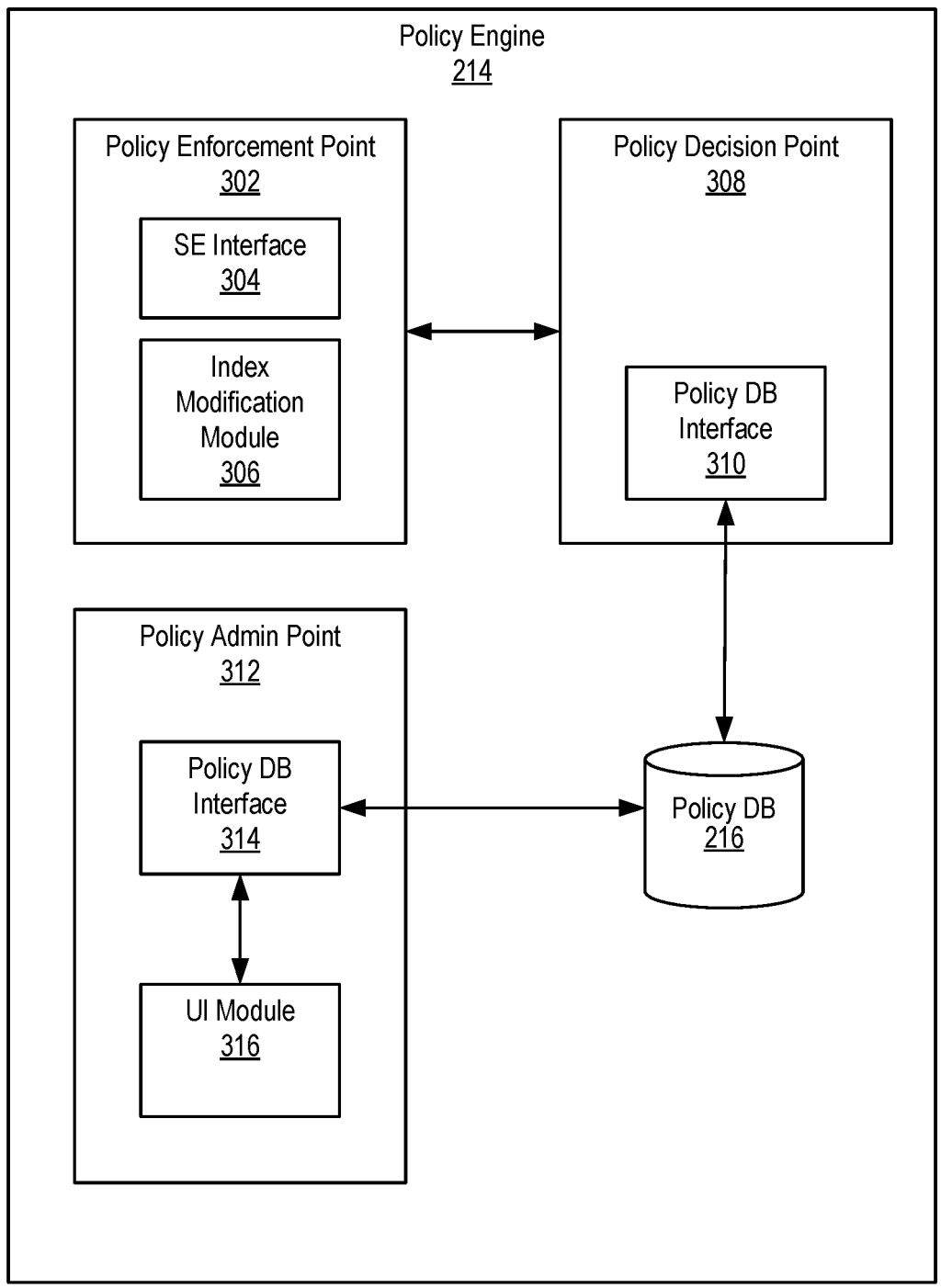
FIG. 3 is a block diagram of an example policy engine.

FIG. 3 is a block diagram of an example policy engine 214. Each component of the policy engine 214 can be implemented on one or more hardware computer processors configured to execute instructions stored on a non-transitory storage medium. The policy engine 214 includes a policy enforcement point (PEP) 302. The PEP 302 is a component of the policy engine 214 configured to enforce a data access policy on searches.

The PEP 302 includes a search engine interface 304. The search engine interface 304 is a component of the PEP 302 configured to communicate with a search engine. The communication can include receiving indices from a preprocessor of the search engine and providing modified indices to a query processing module of the search engine. The search engine interface 304 can include a plugin module for the search engine. The search engine interface 304 can communicate with the search engine through an API. The PEP 302 can have multiple search engine interfaces 304, each corresponding to a particular search engine that has a particular way of indexing search queries.

The PEP 302 includes an index modification module 306. The index modification module 306 is a component of the PEP 302 configured to parse indices received from a preprocessor of a search engine through the search engine interface 304 to identify index terms and relationships between the index terms, and modify the indices to negate one or more index terms. The index modification module 306 provides the modified indices to the search engine interface 304.

A policy decision point 308 provides logics of, and instructions on, modifying the indices to the index modification module 306. The policy decision point 308 is a component of the policy engine 214 configured to determine, based on credentials of a user and one or more policies associated with the user, which index term to modify or negate. For example, a particular policy P can specify that user X is prohibited from searches related to a particular index term I, e.g., "winter." The policy decision point 308 can receive user credentials from the PEP 302, determine that the user credentials indicates that a user requesting the search is user X, and in response, inform the index modification module 306 to negate the index term I if the index term I ("winter") does appear in the indices. The negation of index term I can prevent the user from querying content related to the index term I, even if the query does not contain the exact term I. For example, negating an index term "winter" can prevent a user from searching on "winters" or "wintering" in addition to preventing a search on "winter."

A policy database 216 can store policies for one or more users. The policies can be stored as one or more files or one or more structured tables, e.g., database tables. The policy database 216 can be a distributed database. The policy decision point 308 can include a policy database interface 310. The policy database interface 310 is a component of the policy decision point 308 configured to search the policy database 216 based on user credentials, e.g., user name or user group identifier.

The policy engine 214 can include a policy administration point 312. The policy administration point 312 is a component of the policy engine 214 configured to create, edit and manage policies. The policy administration point 312 includes a policy database interface 314 configured to store policies in the policy database 216 and read policies from the policy database 216. The policy administration point 312 can include a user interface module 316 configured to provide a user interface for editing and storing policies. Additional details of the operations of the user interface module 316 are described below in reference to FIG. 4.

Figure 4:
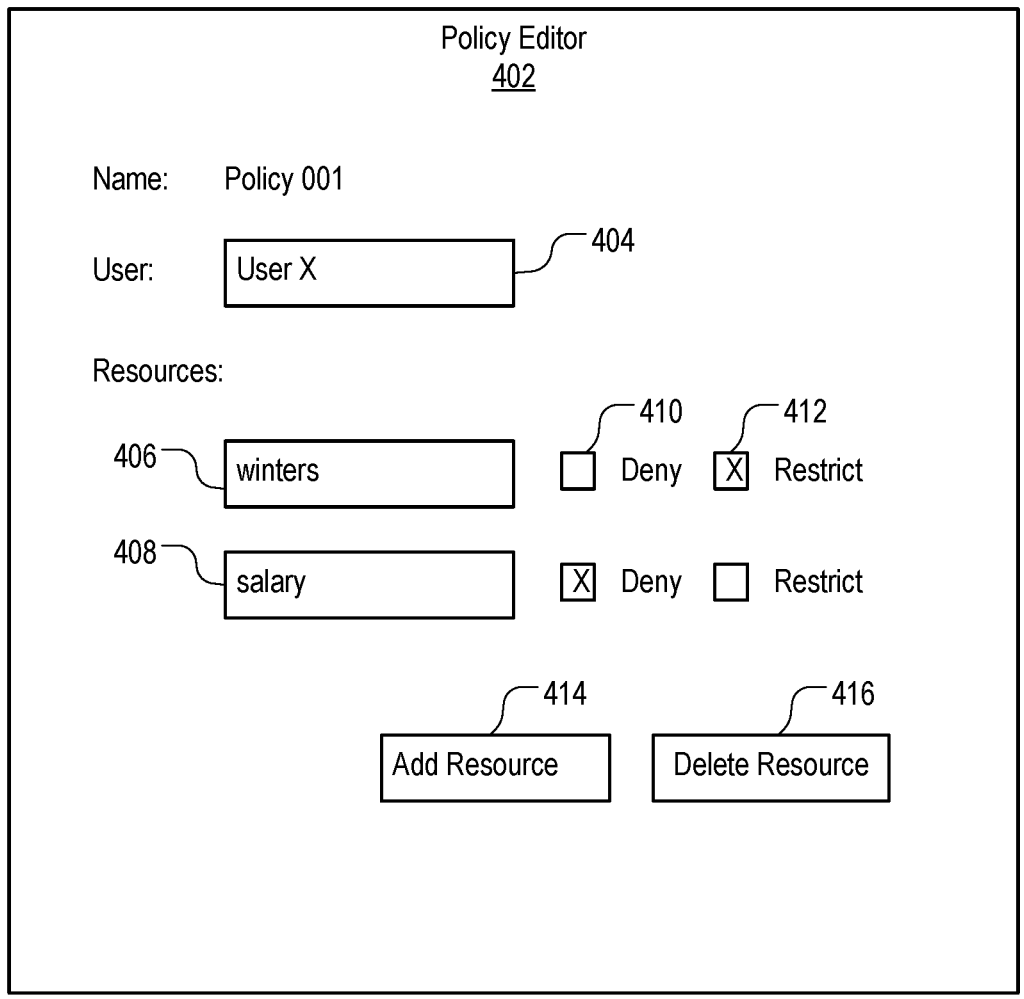
FIG. 4 is an example user interface for configuring a policy.

FIG. 4 is an example user interface for configuring a policy. The user interface can be provided by a user interface module of a policy administration point, e.g., the user interface module 316 of the policy administration point 312 of FIG. 3.

In the example shown, the user interface includes a policy editor 402 for editing a particular policy, Policy 001. The policy editor 402 includes a user name field 404 configured to receive user input specifying a user, e.g., User X, or a group of users, e.g., guest users. The particular policy will be enforced on the specified user or any user who belongs to the specified group of users.

The policy editor 402 includes a resource section for specifying one or more resources the access to which is limited. The resources can include file names, directory names, links (e.g., URLs) and in particular, search terms or index terms. The policy editor 402 can include resource fields 406 and 408. Each of the resource fields 406 and 408 is configured to receive a text string, e.g., "winters" or "salary." Upon receiving a text string, the policy administration point can normalize the text string into an index term. For example, the policy administration point can normalize the string "winters" into "winter." The policy administration point can delegate the normalization to a search engine.

For each resource, the policy editor 402 can present one or more access control fields that specify what access privilege a user does or does not have on that resource. For example, for a particular search term "winters," the policy editor 402 can present a first selection item 410 for denying access for a user. In the example shown, the selection item 410 is a checkbox. In various implementations, the selection item 410 can have other form, e.g., an entry in a pull down list. If selected, the policy will prohibit the user from searching on the resource.

Alternatively or additionally, the policy editor 402 can present a second selection item 412 for restricting access for a user. If selected, the policy can specify that some or all content returned for that resource are redacted or otherwise masked. Accordingly, a PEP enforcing the policy can inform a search engine to return an entry related to the resource, but redact it in such a way that the content is hidden and a link is inaccessible.

The policy editor 402 can include an add resource user interface item 414. The add resource user interface item 414 is configured to receive a user input for adding a resource, e.g., a new index term, to the policy. The policy editor 402 can include a delete resource user interface item 416. The delete resource user interface item 416 is configured to receive a user input for deleting an existing resource, e.g., a selected index term, from the policy.

In addition to editing a policy using the policy editor 402, a user can create or edit a policy using batch upload. Policies can be stored in database tables or in text format, e.g., as files in a markup language, e.g., XML.

Figure 5:
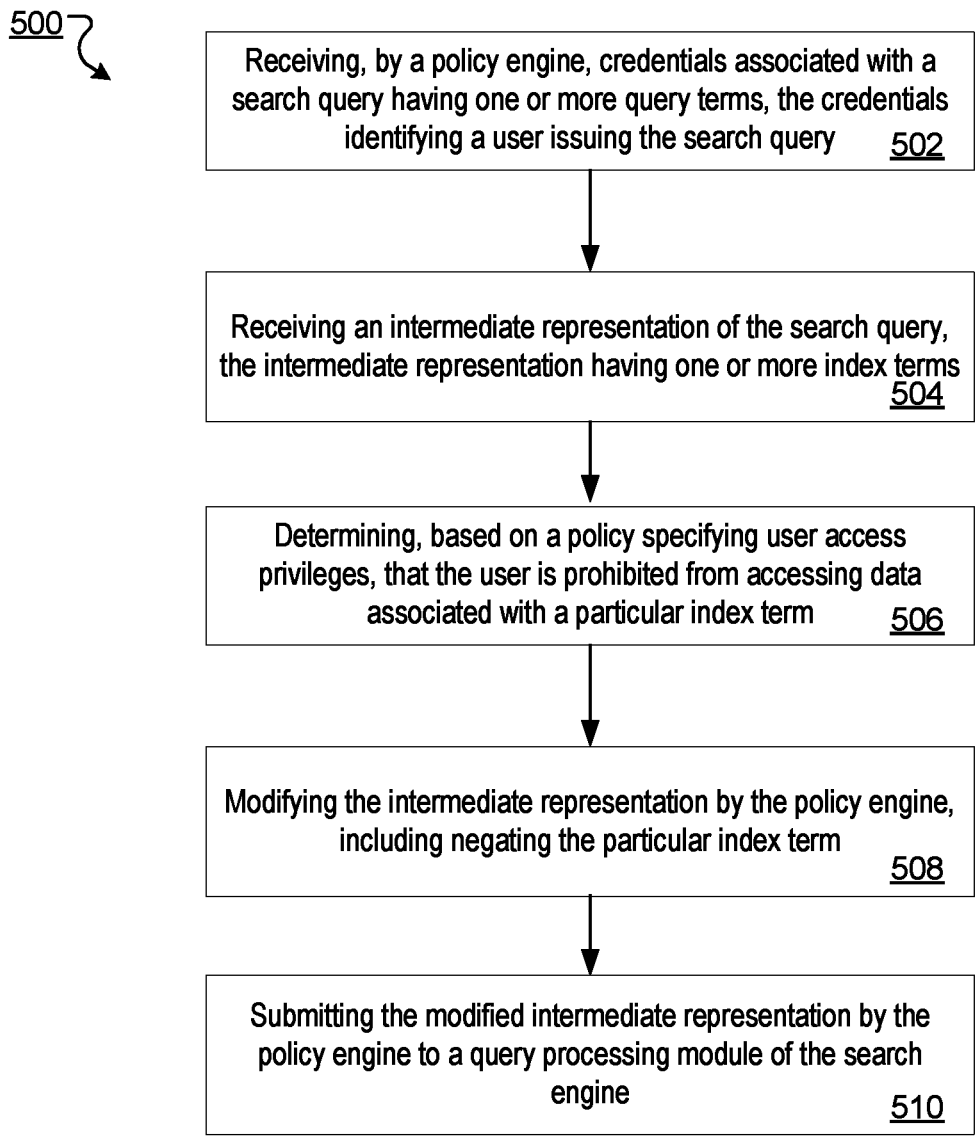
FIG. 5 is a flowchart of an example process of enforcing policies on a search engine. Like reference numbers and designations in the various drawings indicate like elements.

FIG. 5 is a flowchart of an example process 500 of enforcing policies on a search engine. The process 500 can be performed by a policy engine, e.g., the policy engine 214 of FIG. 2.

The policy engine receives (502) credentials associated with a search query comprising one or more query terms. The credentials identify a user issuing the search query. The search query can be different from a database query, where the search query can have free form text that may contain typographical errors, e.g., "winter sports trivai" and the database query can be in a structured language, e.g., SQL.

The policy engine receives (504) an intermediate representation of the search query generated by a preprocessor of a search engine. The intermediate representation can include one or more index terms corresponding to the one or more query terms. Each of the one or more index terms is a normalized text string corresponding, in meaning, to at least one of the one or more query terms. The policy engine can include a search engine plugin that is logically positioned between the preprocessor and a query processing module of the search engine.

The policy engine determines (506), based on a policy specifying user access privileges, that the user is prohibited from accessing data associated with a particular index term of the one or more index terms. The policy is configured by a policy administration point including one or more processors. The policy administration point can associate an identifier of the user and the particular index term with an access rule.

The policy engine modifies (508) the intermediate representation, including negating the particular index term. Negating the particular index term can include removing the particular index term from the intermediate representation. Negating the particular index term can include associating a logical filter with the particular index term, the logical filter causing a query processing module to exclude the content when performing a search. The logical filter can include a clause that includes operators "AND" and "NOT." The operations of modifying the intermediate representation can be performed by a customizable search engine plugin. The plugin can be customized for various search platforms, allowing the algorithm to be implemented on various systems.

The policy engine submits (510) the modified intermediate representation to a query processing module of the search engine. The query processing module can generate one or more search results excluding content corresponding to the particular index term. Accordingly, the policy engine prevents the user from searching for content that is related to the index term, even when the user does not request a search using the exact word in the index term.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:

receiving, by a policy engine that comprises one or more computer processors, credentials associated with a search query comprising one or more query terms that include a search query term, the credentials identifying a user issuing the search query;

receiving, by the policy engine, an intermediate representation of the search query generated by a preprocessor of a search engine, the intermediate representation comprising one or more index terms as a normalized text string corresponding to the one or more query terms, the normalized text string including a normalized query term that is a variation of the search query term;

determining, by the policy engine based on a policy specifying user access privileges, that the user is prohibited from accessing data associated with a particular index term;

identifying, by the policy engine, that the normalized query term is the same as the particular index term;

in response to said identifying, modifying the intermediate representation by the policy engine by negating the normalized index term in the intermediate representation; and submitting the modified intermediate representation by the policy engine to a query processing module of the search engine, the query processing module operable to generate one or more search results, based on the modified intermediate representation, that exclude content corresponding to the particular index term and the search query term.

2. The method of claim 1, wherein the policy engine includes a search engine plugin that is logically positioned between the preprocessor and the query processing module.

3. The method of claim 1, wherein the policy is configured by a policy administration point including one or more processors, the policy administration point associating an identifier of the user and the particular index term with an access rule.

4. The method of claim 1, wherein negating the normalized index term in the intermediate representation includes removing the normalized index term from the intermediate representation.

5. The method of claim 1, wherein negating the normalized index term in the intermediate representation includes associating a logical filter with the normalized index term in the intermediate representation, the logical filter causing the query processing module to exclude the content corresponding to the particular index term and the search query term.

6. The method of claim 5, wherein the logical filter includes a clause that includes one or more of operators AND and NOT.

7. The method of claim 1, wherein the policy engine submits the modified intermediate representation through an application programming interface (API).

8. A non-transitory computer readable storage medium storing instructions executable by a data processing apparatus and upon such execution cause the data processing apparatus to perform operations comprising:
- receiving, by a policy engine, credentials associated with a search query comprising one or more query terms that include a search query term, the credentials identifying a user issuing the search query;
- receiving, by the policy engine, an intermediate representation of the search query generated by a preprocessor of a search engine, the intermediate representation comprising one or more index terms as a normalized text string corresponding to the one or more query terms the normalized text string including a normalized query term that is a variation of the search query term;
- determining, by the policy engine based on a policy specifying user access privileges, that the user is prohibited from accessing data associated with a particular index term;
- identifying, by the policy engine, that the normalized query term is the same as the particular index term;
- in response to said identifying, modifying the intermediate representation by the policy engine by negating the normalized index term in the intermediate representation; and
- submitting the modified intermediate representation by the policy engine to a query processing module of the search engine, the query processing module operable to generate one or more search results, based on the modified intermediate representation, that exclude content corresponding to the particular index term and the search query term, wherein the policy engine comprises one or more computer processors.

9. The non-transitory computer readable storage medium of claim 8, wherein the policy engine includes a search engine plugin that is logically positioned between the preprocessor and the query processing module.

10. The non-transitory computer readable storage medium of claim 8, wherein the policy is configured by a policy administration point including one or more processors, the policy administration point associating an identifier of the user and the particular index term with an access rule.

11. The non-transitory computer readable storage medium of claim 8, wherein negating the normalized index term in the intermediate representation includes removing the normalized index term from the intermediate representation.

12. The non-transitory computer readable storage medium of claim 8, wherein negating the normalized index term in the intermediate representation includes associating a logical filter with the normalized index term in the intermediate representation, the logical filter causing the query processing module to exclude the content.

13. The non-transitory computer readable storage medium of claim 12, wherein the logical filter includes a clause that includes one or more of operators AND and NOT.

14. The non-transitory computer readable storage medium of claim 8, wherein the policy engine submits the modified intermediate representation through an application programming interface (API).

15. A system comprising:
- one or more computers and one or more storage devices on which are stored instructions that are operable, when executed by the one or more computers, to cause the one or more computers to perform operations comprising:
- receiving, by a policy engine, credentials associated with a search query comprising one or more query terms that include a search query term, the credentials identifying a user issuing the search query;
- receiving, by the policy engine, an intermediate representation of the search query generated by a preprocessor of a search engine, the intermediate representation comprising one or more index terms as a normalized text string corresponding to the one or more query terms, the normalized text string including a normalized query term that is a variation of the search query term;
- determining, by the policy engine based on a policy specifying user access privileges, that the user is prohibited from accessing data associated with a particular index term;
- identifying, by the policy engine, that the normalized query term is the same as the particular index term;
- in response to said identifying, modifying the intermediate representation by the policy engine by negating the normalized index term in the intermediate representation; and
- submitting the modified intermediate representation by the policy engine to a query processing module of the search engine, the query processing module operable to generate one or more search results, based on the modified intermediate representation, that exclude content corresponding to the particular index term and the search query term.

16. The system of claim 15, wherein the policy engine includes a search engine plugin that is logically positioned between the preprocessor and the query processing module.

17. The system of claim 15, wherein the policy is configured by a policy administration point including one or more processors, the policy administration point associating an identifier of the user and the particular index term with an access rule.

18. The system of claim 15, wherein negating the normalized index term in the intermediate representation includes removing the normalized index term from the intermediate representation.

19. The system of claim 15, wherein negating the normalized index term in the intermediate representation includes associating a logical filter with the normalized index term in the intermediate representation, the logical filter causing the query processing module to exclude the content.

20. The system of claim 19, wherein the logical filter includes a clause that includes one or more of operators AND and NOT.

21. The system of claim 15, wherein each of the one or more index terms is a normalized text string corresponding, in meaning, to at least one of the one or more query terms.

22. The system of claim 15, wherein the policy engine submits the modified intermediate representation through an application programming interface (API).

* * * * *